United States Patent [19]

Choly

[11] 4,423,999
[45] Jan. 3, 1984

[54] MECHANICAL HAND FOR A DOOR-OPENER

[75] Inventor: Mitchell Choly, Troy, Mich.

[73] Assignee: General Motors Corporation, Detroit, Mich.

[21] Appl. No.: 302,105

[22] Filed: Sep. 14, 1981

[51] Int. Cl.³ .............................................. B25J 5/02
[52] U.S. Cl. .................................. 414/744 A; 118/323; 118/324; 118/500; 427/424; 414/730; 414/740; 294/19 R; 294/103 R
[58] Field of Search ............... 294/83 R, 19 R, 103 R; 414/744 A, 1, 4, 7, 373, 684.3, 744 R, 917, 730, 607, 740; 254/131; 72/705; 73/432 V, 112; 118/323, 324, 500; 427/424; 29/559; 49/503

[56] References Cited

U.S. PATENT DOCUMENTS

| 2,910,321 | 10/1959 | Sehn et al. | 414/740 X |
| 3,178,040 | 4/1965 | Nelson | 414/740 X |
| 3,440,760 | 4/1969 | Thompson | 73/112 X |
| 4,290,730 | 9/1981 | Weaver | 414/607 |
| 4,342,535 | 8/1982 | Bartlett et al. | 414/744 A |
| 4,342,536 | 8/1982 | Akeel et al. | 414/744 A |

Primary Examiner—Frank E. Werner
Assistant Examiner—Terrance L. Siemens
Attorney, Agent, or Firm—Edward J. Biskup

[57] ABSTRACT

A mechanical hand for use with a door-opener and having a pair of pivotable members, one of which is insertable into the window pane slot of a vehicle door, and the other of which engages the inner panel of the vehicle door so that the latter is capable of being opened and closed by the door-opener.

3 Claims, 12 Drawing Figures

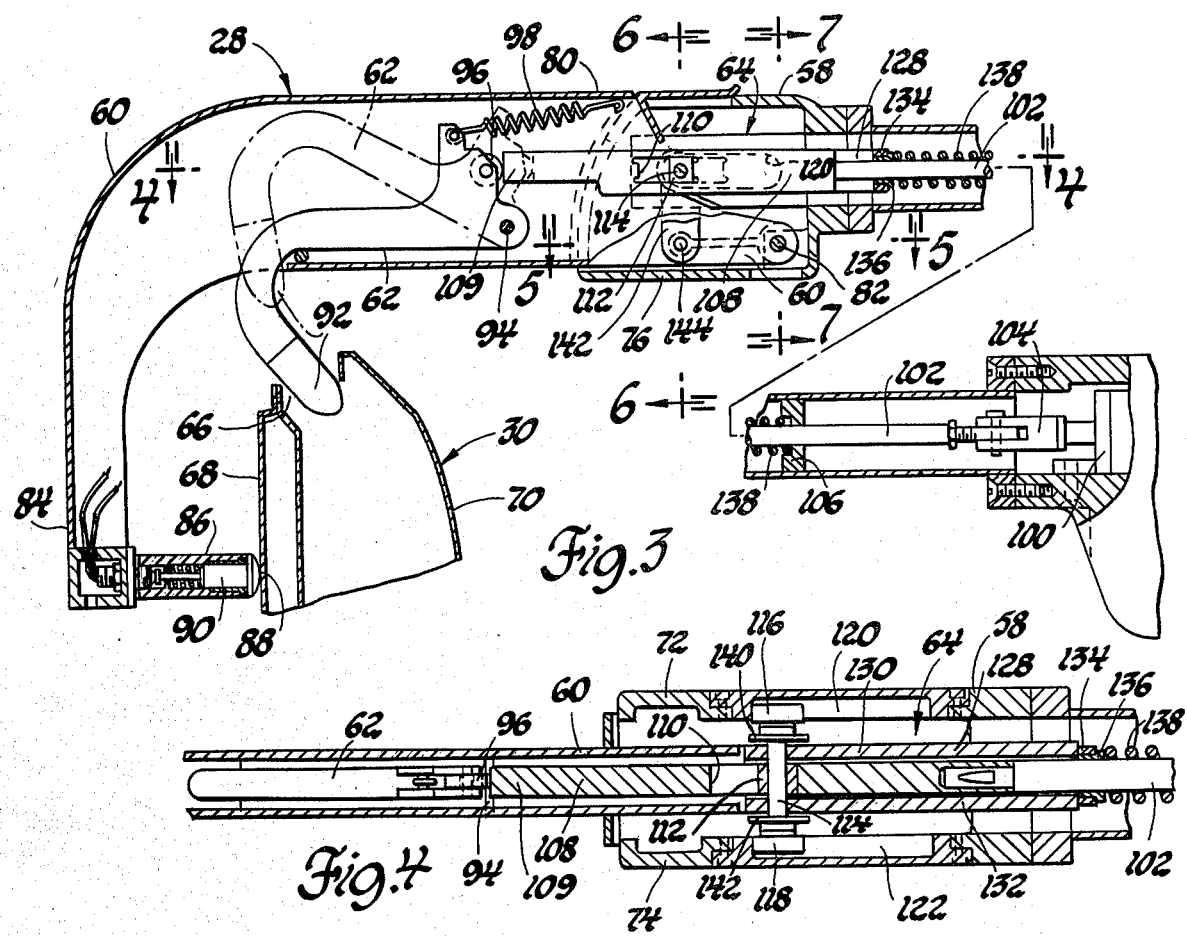

MECHANICAL HAND FOR A DOOR-OPENER

This invention concerns a mechanical hand which forms a part of a vehicle door-opener and is adapted to engage the vehicle door and allow such door to be opened or closed by the door-opener.

U.S. Pat. No. 4,342,536 issued on Aug. 3, 1982 in the names of Hadi K. A. Akeel et al and assigned to the assignee of this invention, discloses a car door-opener having an articulated arm provided with a gripper which includes a pivotable jaw. The gripper serves to seize a vertically orientated rod on a fixture attached to the inner panel of a vehicle door so as to allow the door to be opened and closed during a paint-spraying operation while the vehicle body is conveyed along an assembly line. One problem with this form of gripper is that the fixtures must be manually attached to the vehicle door when the vehicle body enters the spray booth and must be manually detached when the body exits. Another problem is that different vehicle bodies require different types of fixtures which results in a large quantity of fixtures being stored and maintained.

Accordingly, the objects of the present invention are: to provide a new and improved mechanical hand for use with a door-opener and adapted to engage the sheet metal portion of the vehicle door to cause opening and closing movement thereof; to provide a new and improved mechanical hand having a pair of pivotable members, one of which is insertable into the window pane slot of the vehicle door and the other of which engages the inner panel of the vehicle door so that the door is capable of being opened and closed by a door-opener; to provide a new and improved mechanical hand for use with a vehicle door-opener and that includes a pair of pivotable members that are sequentially movable into engagement with a door so that the door can be opened and closed by the door-opener while the vehicle is conveyed through a paint booth; and to provide a new and improved mechanical hand for a door-opener that serves to open and close the vehicle door while work is being performed thereon and does not require a separate fixture to be mounted on the door for gripping purposes but, instead, utilizes the formed panels of the door as contact surfaces engageable by a pair of pivotable members so that movement of the mechanical hand towards and away from the vehicle body results in closing and opening of the door, respectively.

In the preferred form, these and other objects and advantages of the invention are realized by a mechanical hand which forms part of a door-opener that serves to open and close a vehicle door having an inner panel and an outer panel defining a window pane slot. The mechanical hand comprises a housing which pivotally supports a pull member for movement between a raised position wherein a contact surface formed on the pull member is located above the window pane slot, and a lowered position wherein the contact surface is located in horizontal alignment and in engagement with the inner panel of the door. A push member is also provided and is pivotally connected to the pull member so as to permit a projection formed on the push member to be inserted into the window pane slot when the pull member is located in the lowered position. In addition, an actuator is operatively connected to the pull member and the push member and serves to sequentially move the pull member from the raised position to the lowered position, followed by movement of the projection formed on the push member into the window pane slot so that the vehicle door can be opened and closed by the door-opener.

These and other objects and advantages of the present invention will be apparent from the following detailed description when taken in conjunction with the accompanying drawings, in which:

FIG. 3 is an enlarged view, with parts broken away, showing the arm of the door-opener of FIGS. 1 and 2, and the mechanical hand and located in the lowered position;

Figure 8:
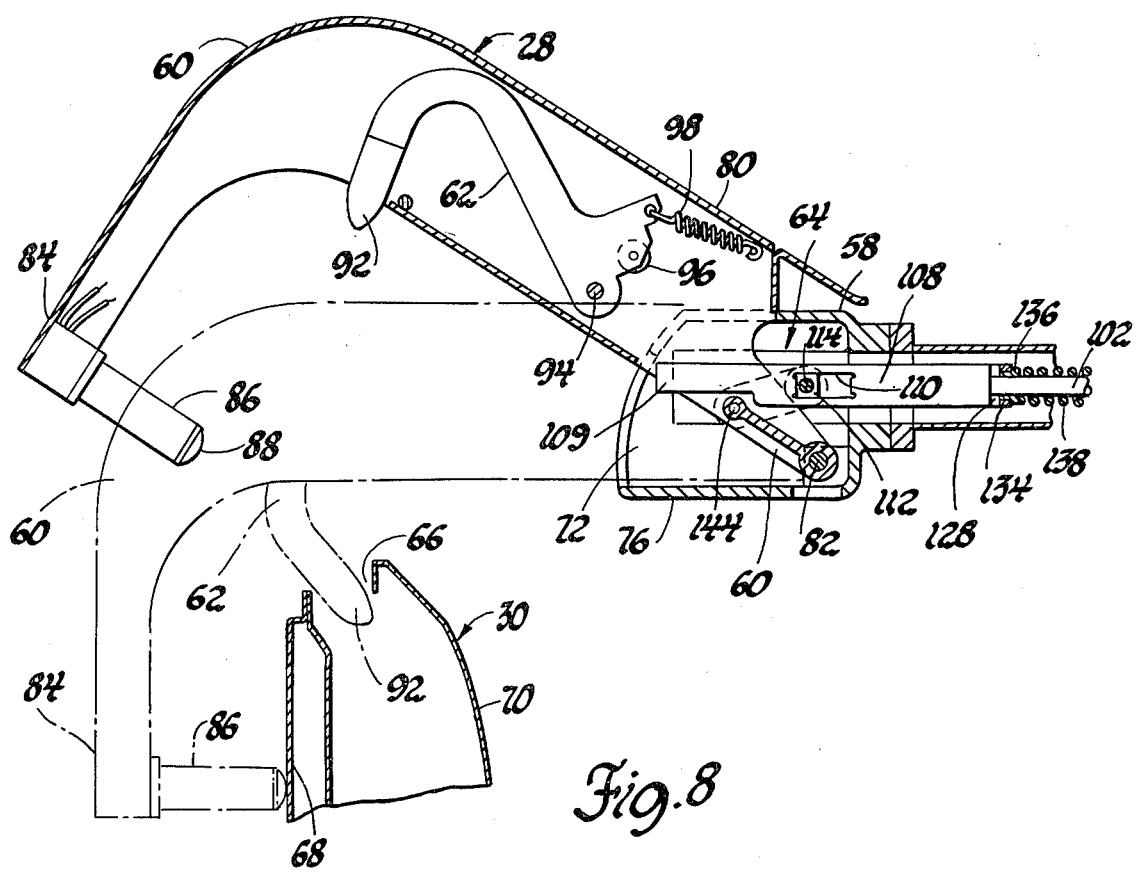
Figure 9:
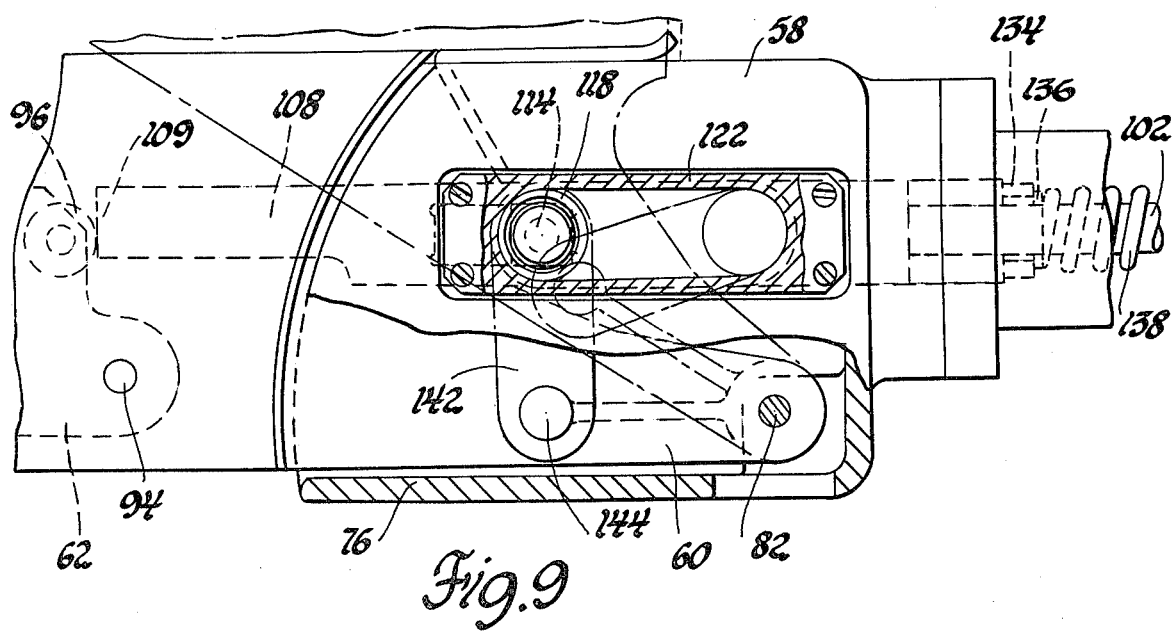
Figure 10:
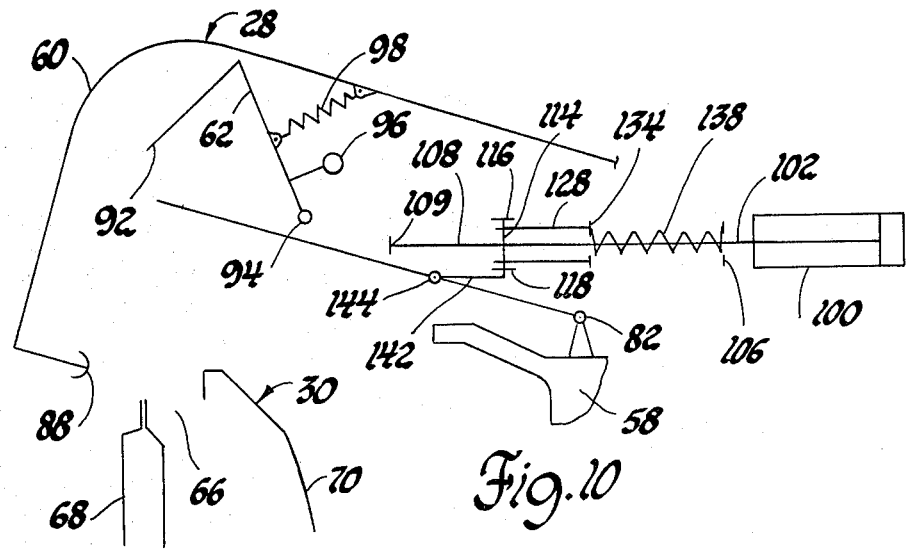
Figure 11:
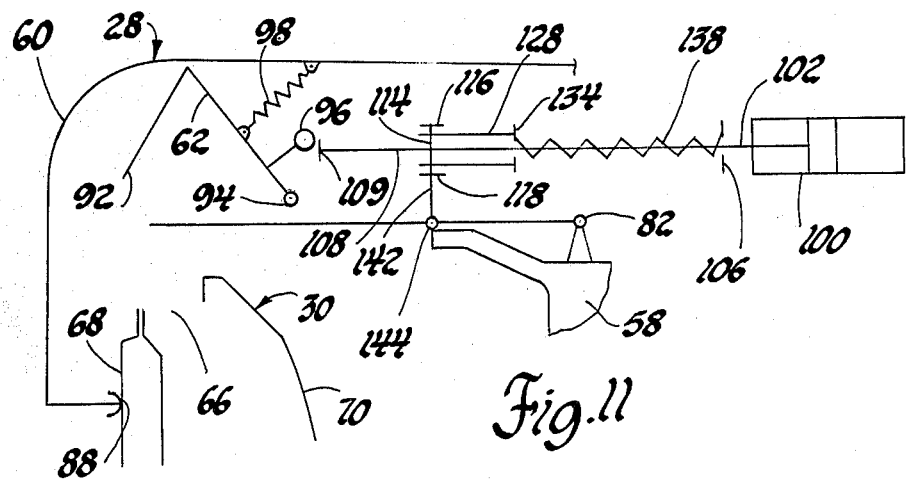
Figure 12:
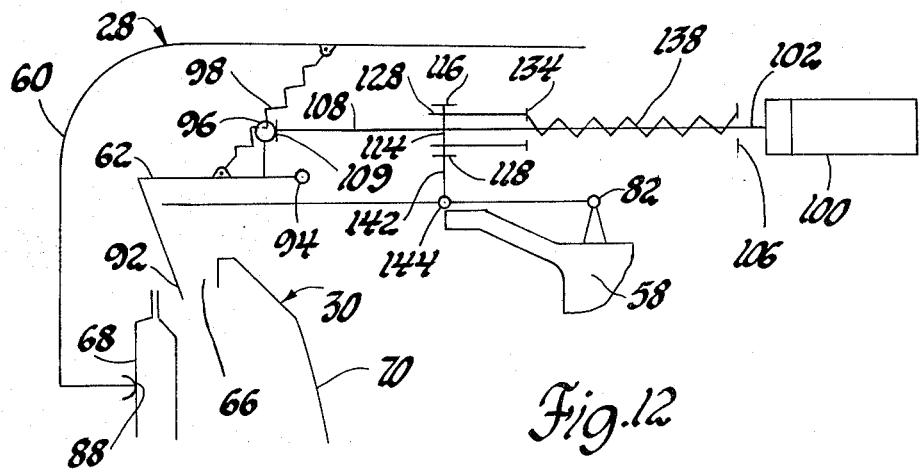

FIGS. 4 and 5 are sectional views of the mechanical hand taken on lines 4—4 and 5—5, respectively, of FIG. 3;

FIGS. 6 and 7 are enlarged sectional views of the mechanical hand taken on lines 6—6 and 7—7, respectively, of FIG. 3;

FIG. 8 is a view similar to that of FIG. 3, but shows the mechanical hand in the raised position;

FIG. 9 is a further enlarged sectional view of the mechanical hand taken on line 9—9 of FIG. 6; and FIGS. 10, 11, and 12 are schematic diagrams of the mechanical hand illustrating the sequential positions assumed by the pull and push members during opening and closing operation of the door-opener.

Figure 1:
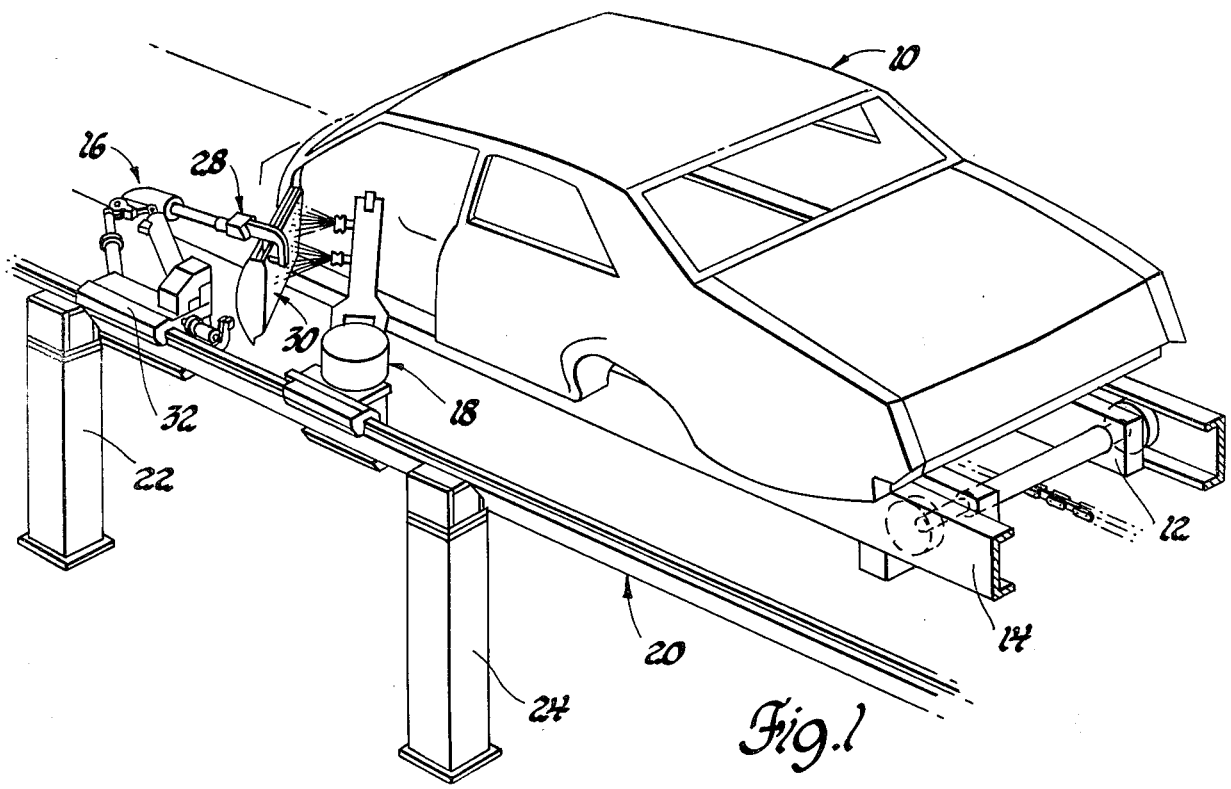
FIG. 1 is an environmental view showing a sheet metal vehicle body being conveyed past a door-opener which incorporates a mechanical hand made in accordance with the present invention.

Referring to the drawings and more particularly to FIG. 1 thereof, a sheet metal vehicle body 10 is shown mounted on a carrier 12 and being conveyed on a track 14 through a conventional paint booth which, in this case, houses a door-opener 16 that operates in conjunction with a paint robot 18. Both the door-opener 16 and the paint robot 18 are supported on a horizontal guide-rail 20 for movement in either direction along a path parallel to the path of travel of the vehicle body 10. The guide-rail 20 is mounted on spaced stanchions, two of which are shown in FIG. 1 and identified by reference numerals 22 and 24. In addition and as seen in FIG. 2, the guide-rail 20 is formed with a rack 26 that is engaged by appropriate toothed gearing (not shown) which forms a part of both the door-opener 16 and the paint robot 18 for causing driving movement of each of these devices along the guide-rail 20.

Figure 2:
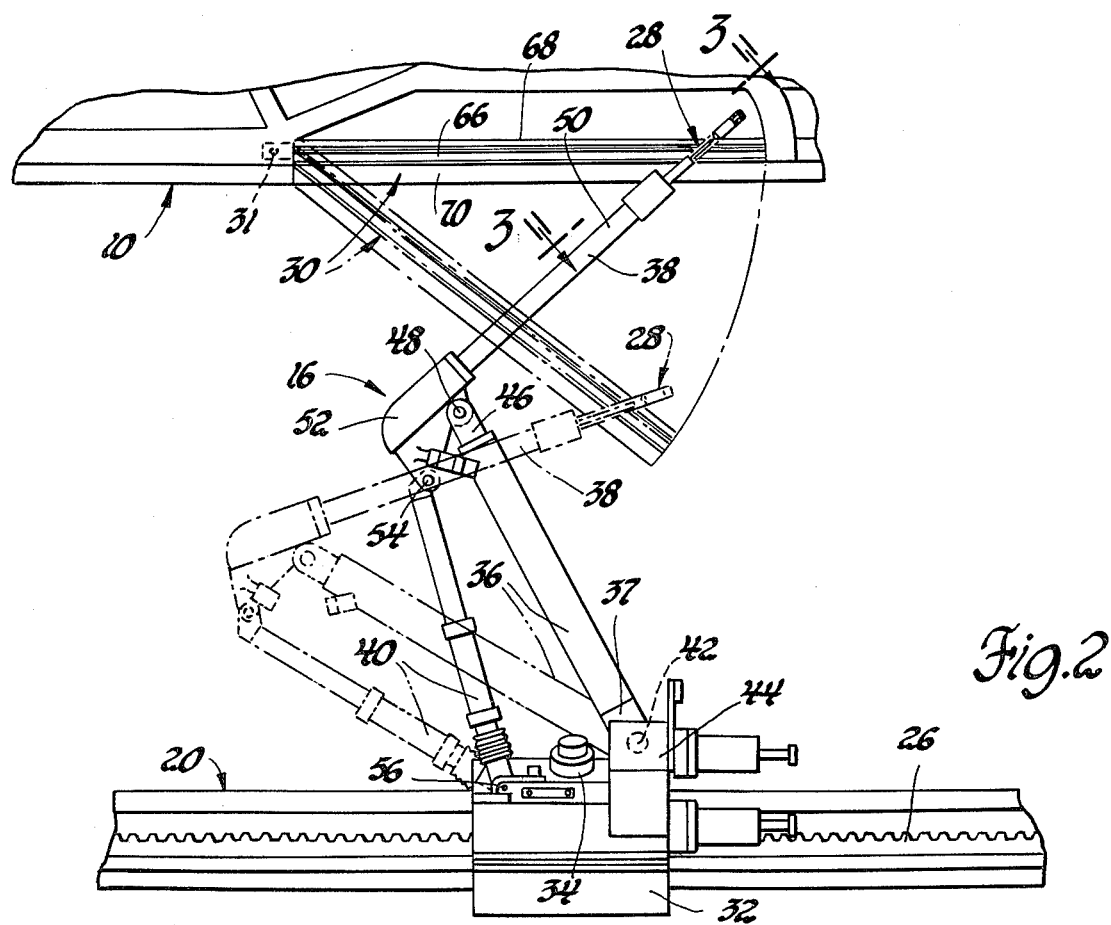
FIG. 2 is a plan view showing the door-opener of FIG. 1 in the door-closed position and the door-opened position.

As seen in FIGS. 1 and 2, the door-opener 16 includes a mechanical hand 28 made in accordance with the invention that is adapted to engage a vehicle door 30 after which the door 30 is moved about its hinged connection 31 to a door-opened position so that the interior panels of the door 30 can be painted by the paint robot 18 during the painting operation of the vehicle body 10. Subsequently, the door 30 is closed by the door-opener 16 and the mechanical hand 28 is disengaged therefrom, after which the door-opener 16 returns to a "ready" position awaiting arrival of another vehicle body for repeating the door-opening and closing operations. It will be noted that the door-opener 16 and paint robot 18 are intended to be program-controlled so that their movements and positions can be coordinated during the painting operation.

A detailed description of the door-opener 16 is provided in the aforementioned U.S. Pat. No. 4,342,536, and therefore reference is made thereto for a complete understanding of the construction and operation thereof. For present purposes, however, it will suffice to mention that the door-opener 16 comprises a carriage 32 supported for sliding movement along the guide-rail 20, and that the carriage 32 houses the aforementioned toothed gearing (not shown) which meshes with the teeth of rack 26. Also, a rotary hydraulic motor 34, mounted on the carriage 32, serves to drive the toothed gearing and thereby causes the carriage 32 to move in either direction along the guide-rail 20. The door-opener 16 also includes a primary arm 36, a secondary arm 38, and a control link 40—all of which are connected to and supported by the carriage 32. In this regard it will also be noted that the primary arm 36 has its inner end 37 supported by the carriage 32 for rotary movement about a pivotal connection 42 having a vertical axis and is driven about the pivotal connection 42 by a hydraulic vane motor 44. The outer end 46 of the primary arm 36 is connected by a pivotal connection 48 to an intermediate portion of the secondary arm 38, the outer end 50 of which carries the mechanical hand 28. The inner end 52 of the secondary arm 38 is connected by a pivotal connection 54 to one end of the control link 40. The other end of the control link 40 is connected to the carriage 32 by a pivotal connection 56 which is spaced from the pivotal connection 42.

As best seen in FIGS. 3 through 7, the mechanical hand 28 of the present invention includes a housing 58, a hollow L-shaped pull member 60, a J-shaped push member 62, and an actuator mechanism 64 for moving the pull member 60 and push member 62 between the full-line and phantom-line positions shown in FIGS. 3 and 8. As will be better understood as the description of the invention proceeds, the pull member 60 and push member 62 of the mechanical hand 28 are adapted to engage the vehicle door 30 which has the usual window pane slot 66 defined by the inner panel 68 and outer panel 70 thereof. Thereafter the door opener 16 serves to move the door 30 between the opened and closed positions shown in FIG. 2.

More specifically, the housing 58 includes a pair of laterally spaced side walls 72 and 74, a bottom wall 76 and a top wall 78. The inner portion 80 of the pull member 60 is connected to the housing 58 by a transversely extending pin 82—the opposite ends of which are fixed to the side walls 72 and 74, as seen in FIG. 5. The outer portion 84 of the pull member 60 includes a switch 86 having a contact surface 88 formed on a plunger 90 which is movable axially outwardly and thereby provides an output signal when the pull member 60 engages the inner panel 68 of the vehicle door 30.

The push member 62 is located within the hollow interior of the pull member 60 and is formed with a projection 92 at one end thereof. The other end of the push member 62 is connected to the pull member 60 by a transversely extending pin 94 which permits the push member 62 to pivot between the full line and phantom line positions shown in FIG. 3. A roller 96 is rotatably mounted on the push member 62, and a tension spring 98 is connected at one end to the pull member 60 and at the other end to the push member 62. The spring 98 normally biases the push member 62 in a clockwise direction about the pin 94 (as seen in FIG. 3).

The actuator mechanism 64 includes an air cylinder 100 which is mounted within the secondary arm 38 adjacent the inner end 52 thereof. One end of a rod 102 is connected to the piston rod 104 of the air cylinder 100 and is supported for axial movement by a block member 106 fixed within the secondary arm 38. The other end of the rod 102 is fixed to a slider member 108 which is formed with a slot 110 and has an outer end 109. A square block 112 is located within the slot 110 and is fixed to the midportion of a transversely extending pin 114, the opposite ends of which rotatably support identical rollers 116 and 118, adapted to move within guide-tracks 120 and 122 respectively located in side walls 72 and 74 of housing 58. As seen in FIG. 6, the pin 114 is also secured by setscrews 124 and 126 to a carrier 128 which includes a pair of side walls 130 and 132 located on opposite sides of the slider member 108. The side walls 130 and 132 are interconnected at the inner end of the carrier 128 by a ring 134 which supports a bushing 136 which, in turn, supports the rod 102 for sliding movement relative to the carrier 128. A coil spring 138 is wound around the rod 102 and has one end contacting the bushing 136 and the other end contacting the block member 106. The spring 138 normally biases the carrier 128 towards the push member 62 and the block 112 within the slot 110 to provide a lost-motion connection between the slider member 108 and the carrier 128.

As best seen in FIGS. 3 through 6, the upper ends of a pair of identical link members 140 and 142 connect the pull member 60 to the pin 114 fixed to the carrier 128. In this regard it will be noted that the lower ends of the link members 140 and 142 are connected to the pull member 60 by a pin 144, while the upper end of each link member 140 and 142 is supported for pivotal movement by the pin 114 adjacent one side wall 130,132 of the carrier 128.

FIGS. 10, 11, and 12 schematically show the mechanical hand 28 described above. It will be noted that corresponding parts of the hand 28 shown in FIGS. 3 through 7 and FIGS. 10 through are identified by the same numerals. With reference to the schematic diagrams shown in FIGS. 10 through 12 and the view of the door-opener 16 shown in FIGS. 2, the operation of the mechanical hand 28 will now be described.

As the sheet metal vehicle body 10 enters the work station (FIG. 1) wherein the door-opener 16 and paint robot 18 are located, it passes a model recognition detector (not shown) which would send a signal to a controller (not shown). When the carriage 32 is properly positioned relative to the vehicle door 30, the controller commands the hydraulic vane motor 44 to rotate in a clockwise direction, moving the primary arm 36 to the extended position shown in full lines in FIG. 2. During this time the piston rod end of the air cylinder 100 is pressurized so that the slider member 108 is located in the fully-retracted position shown in FIG. 8 to compress the spring 138 between the bushing 136 and the block member 106. As a result, the pull member 60 assumes the raised position, shown in full lines in FIGS. 8 and 10, above the vehicle door 30. The controller then provides a programmed signal which results in both ends of the air cylinder 100 being connected to atmosphere so that the spring 138 causes the carriage 128 and slider member 108 to be moved to the left (as seen in FIGS. 8 and 11) until the rollers 116 and 118 are located in the positions seen in FIG. 4, and the slider member 108 is positioned in the intermediate position shown in phantom lines in FIG. 3 and in full lines in FIG. 11. This movement is transmitted to the pull member 60 through the link members 140 and 142 to cause pivoting of the pull member 60 to the lowered position of FIGS. 3 and 11, with the push member 62 still stored within the pull member 60, as seen in the phantom lines of FIG. 3. The contact surface 88 then engages the inner panel 68 of the door 30 and causes the plunger 90 to close the switch 86 and thereby signal the controller that contact has been made. The controller then provides a programmed signal which results in the base end of the air cylinder 100 being pressurized so as to cause the outer end 109 of the slider member 108 to be moved to the left from the intermediate phantom-line position of FIG. 3 against the roller 96 and thereby pivot the push member 62 counterclockwise about the pin 94 to the extended position and locate the projection 92 within the window pane slot 66 of the vehicle door 30—as seen in FIGS. 3 and 12. The controller then causes the hydraulic vane motor 44 to rotate the primary arm 36 in the counterclockwise direction about the pivotal connection 42. At the same time, movement of the carriage 32 along the guide-rail 20 is coordinated with the traveling movement of the vehicle body 10, permitting the vehicle door 30 to be moved by the pull member 60 to the open-door position shown in phantom lines in FIG. 2. The controller then causes the paint robot 18 to move into position and paint the inner panel 68 of the vehicle door 30. After the inner panel 68 of the vehicle door 30 has been painted, the paint robot 18 moves away from the vehicle door 30 and the controller then causes the door-opener 16 to close the vehicle door 30. During such time the push member 62 moves the vehicle door 30 from the open-door position shown in phantom lines in FIG. 2 to the closed-door position shown in full lines, return the vehicle door 30 to the closed position. The controller then provides a signal causing the piston rod end of the air cylinder 100 to be pressurized so that the pull member 60 and the push member 62 once again assume the raised positions shown in FIGS. 8 and 10. As a result, the door 30 is "released" and the primary and secondary arms 36 and 38 return to the ready position awaiting the arrival of another sheet metal vehicle body which is to be painted.

Various changes and modifications can be made in this construction without departing from the spirit of the invention. Such changes and modifications are contemplated by the inventor, and he does not wish to be limited except by the scope of the appended claims.

The embodiments of the invention for which an exclusive property or privilege is claimed are defined as follows:

1. A mechanical hand for use with a door-opener which serves to open and close a vehicle door having an inner panel and an outer panel which together define a window pane cavity, said mechanical hand comprising a housing adapted to be connected to said door-opener; a pull member having a contact surface formed thereon; means pivotally connecting said pull member to said housing for movement between a raised position wherein said contact surface of said pull member is located above said inner panel, and a lowered position wherein said contact surface engages said inner panel; a push member having a projection formed thereon; means pivotally connecting said push member to said pull member so as to permit said projection to be inserted into said window pane cavity when said pull member is located in said lowered position; and an actuator mechanism operatively connected to said pull member and said push member for moving said pull member from said raised position to said lowered position and for moving said projection of said push member into said window pane cavity whereby said vehicle door is capable of being opened and closed by said door-opener.

2. A mechanical hand for use with a door-opener which serves to open and close a vehicle door having an inner panel and an outer panel which together define a window pane cavity, said mechanical hand comprising a housing adapted to be connected to said door-opener; a pull member having a contact surface formed thereon; means pivotally connecting said pull member to said housing for movement between a raised position wherein said contact surface of said pull member is located above said inner panel, and a lowered position wherein said contact surface engages said inner panel; a push member having a projection formed thereon; means pivotally connecting said push member to said pull member so as to permit said projection to be inserted into said window pane cavity when said pull member is located in said lowered position; and an actuator mechanism operatively connected to said pull member and said push member and having a lost-motion connection for providing sequential movement of said pull member from said raised position to said lowered position, followed by movement of said projection of said push member into said window pane cavity whereby said vehicle door is capable of being opened and closed by said door-opener.

3. A mechanical hand for use with a door-opener which serves to open and close a vehicle door having an inner panel and an outer panel which together define a window pane slot, said mechanical hand comprising a housing adapted to be connected to said door-opener; an L-shaped pull member formed with a hollow interior and having a contact surface formed at one end thereof; means pivotally connecting the other end of said pull member of said housing for movement between a raised position wherein said contact surface of said pull member is located above said inner panel and a lowered position wherein said contact surface is located in horizontal alignment and in engagement with said inner panel; a J-shaped push member located within said hollow interior of said pull member and having a projection formed at one end thereof; means pivotally connecting the other end of said push member to said pull member; spring means between said pull member and said push member for maintaining the latter within said hollow interior of said pull member and permitting said projection to be inserted into said window pane slot when said pull member is located in said lowered position; an actuator mechanism operatively connected to said pull member and said push member, said actuator mechanism including a carrier supported by said housing for movement between two extreme positions and connected by link means to said pull member; a slider member; a lost-motion connection between said carrier and said slider member; and means for driving said carrier from one to the other of said two extreme positions followed by movement of said slider member relative to said carrier whereby said pull member is moved from said raised position to said lowered position followed by movement of said projection of said push member into said window pane slot so that said vehicle door is capable of being opened and closed by said door-opener.

* * * * *